United States Patent
Sahai et al.

(10) Patent No.: US 8,904,296 B2
(45) Date of Patent: Dec. 2, 2014

(54) METHOD AND APPARATUS FOR PRESENTING A PARTICIPANT ENGAGEMENT LEVEL IN AN ONLINE INTERACTION

(75) Inventors: Swapnil Sahai, Lucknow (IN); Abhinav Chakravarty, Gurgaon (IN)

(73) Assignee: Adobe Systems Incorporated, San Jose, CA (US)

(*) Notice: Subject to any disclaimer, the term of this patent is extended or adjusted under 35 U.S.C. 154(b) by 167 days.

(21) Appl. No.: 13/523,346

(22) Filed: Jun. 14, 2012

(65) Prior Publication Data
US 2013/0339875 A1     Dec. 19, 2013

(51) Int. Cl.
*G06F 3/00*     (2006.01)

(52) U.S. Cl.
USPC ........................................................ 715/753

(58) Field of Classification Search
CPC ........ G06Q 10/10; G06F 3/0481; H04N 7/15; H04L 12/1813; H04L 12/581
USPC ........................................................ 715/753
See application file for complete search history.

(56) References Cited

U.S. PATENT DOCUMENTS

| | | | |
|---|---|---|---|
| 6,519,639 B1 * | 2/2003 | Glasser et al. | 709/224 |
| 7,680,480 B2 * | 3/2010 | John et al. | 455/405 |
| 8,312,096 B2 * | 11/2012 | Cohen et al. | 709/207 |
| 8,374,980 B2 * | 2/2013 | Wit et al. | 706/12 |
| 8,402,094 B2 * | 3/2013 | Bosworth et al. | 709/206 |
| 8,612,435 B2 * | 12/2013 | Sambrani et al. | 707/734 |
| 8,700,545 B2 * | 4/2014 | Aberdeen et al. | 706/12 |
| 2005/0099492 A1 * | 5/2005 | Orr | 348/14.08 |
| 2007/0005752 A1 * | 1/2007 | Chawla et al. | 709/224 |
| 2007/0100939 A1 * | 5/2007 | Bagley et al. | 709/204 |
| 2012/0054642 A1 * | 3/2012 | Balsiger et al. | 715/752 |
| 2012/0290950 A1 * | 11/2012 | Rapaport et al. | 715/753 |
| 2013/0091469 A1 * | 4/2013 | Roberts et al. | 715/835 |
| 2013/0124623 A1 * | 5/2013 | Munter | 709/204 |

* cited by examiner

*Primary Examiner* — Alvin Tan
*Assistant Examiner* — James G Pohlman
(74) *Attorney, Agent, or Firm* — Moser Taboada

(57) ABSTRACT

A method and apparatus for presenting a participant engagement index in an online interaction conducted by at least one host for at least one participant is disclosed. The method comprises monitoring a plurality of activities of at least one participant of an online meeting; computing an attentiveness level in response to each activity in the plurality of activities; and displaying a meeting engagement level, wherein the meeting engagement level is an average of the computed attentiveness level for the at least one participant since the start of the online interaction.

14 Claims, 8 Drawing Sheets

METHOD AND APPARATUS FOR PRESENTING A PARTICIPANT ENGAGEMENT LEVEL IN AN ONLINE INTERACTION

BACKGROUND OF THE INVENTION

1. Field of the Invention

Embodiments of the present invention generally relate to web-based conferencing and, more particularly, to a method and apparatus for presenting a participant engagement level in an online interaction.

2. Description of the Related Art

With the rapid growth of the Internet, people are moving to online meetings, presentations and collaboration using various web based tools such as ADOBE® CONNECT® available from ADOBE Systems Incorporated. A typical use case involves a presentation wherein one or more people (referred to herein as hosts) organize the online interaction, and one or more people present a presentation containing content to a number of interested people (referred to herein as participants). The online interaction may be a meeting, collaboration, webinar, or any form of multiparty interaction on the web. As used herein, the term "online meeting" is meant to signify any type of multiparty interaction on the web.

However, online meetings present some challenges due to lack of physical proximity of the people attending the meeting. For example, because participants are not in the same physical location, participants may easily become distracted by events occurring in their immediate environment. Further, a host does not have access to visual cues, such as the sitting posture of participants, participants taking notes, etc. that generally indicate interest levels or attentiveness of the participants. Not having access to visual cues hinders the presenter gauging the engagement levels of the participants in the online meeting and the effectiveness of the communication during the online meeting.

Therefore, there is a need for a method and apparatus for presenting a participant engagement level in an online interaction.

SUMMARY OF THE INVENTION

The present invention provides a method and apparatus for presenting a participant engagement level in an online interaction conducted by at least one host for at least one participant. In one embodiment, the method comprises monitoring a plurality of activities of at least one participant of an online meeting and computing an attentiveness level in response to each of the activities in the plurality of activities. The method then displays a meeting engagement level, wherein the meeting engagement level is an average of the computed attentiveness level for the at least one participant since the start of the online interaction.

Figure 1:
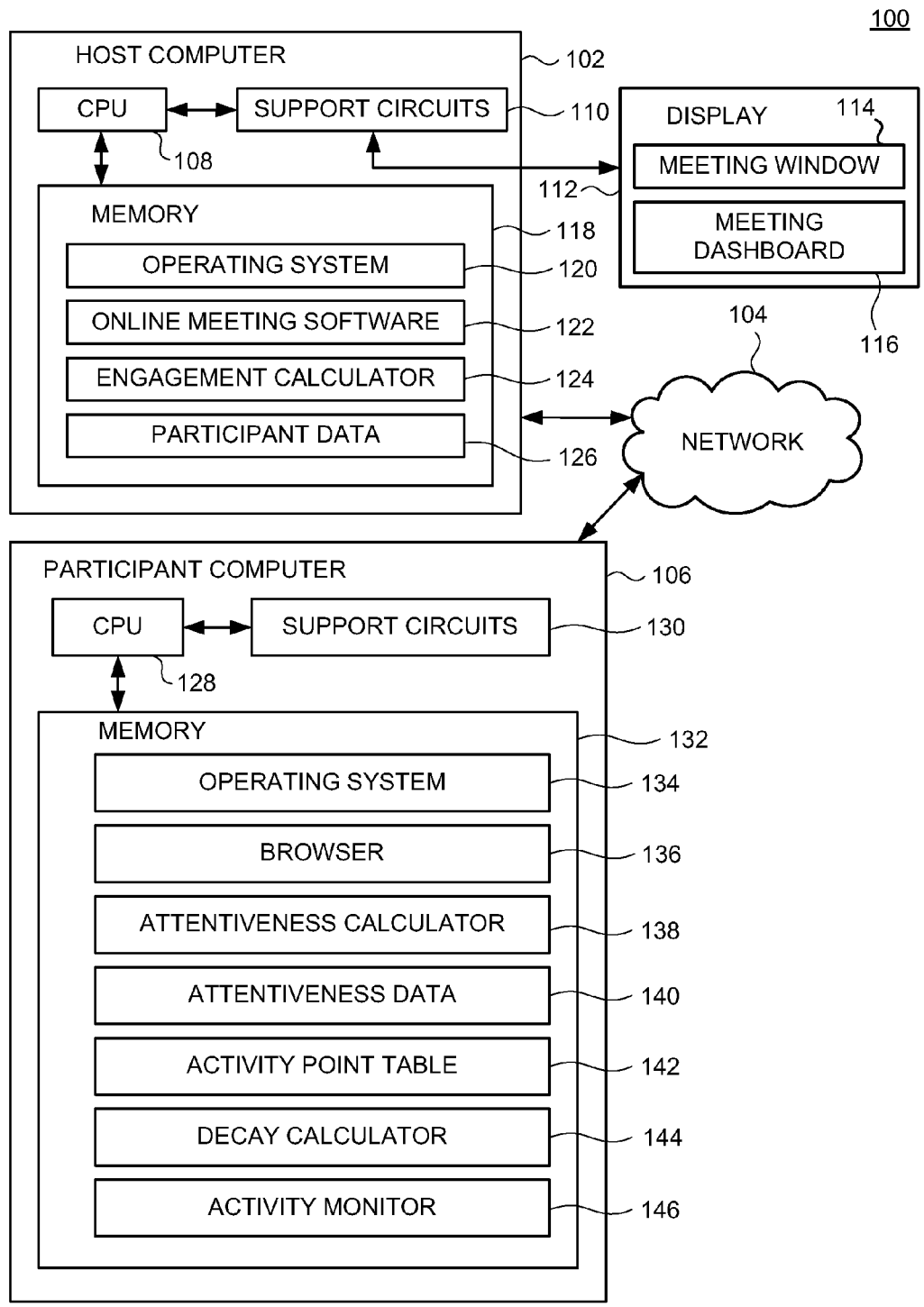
FIG. 1 depicts a block diagram showing one or more participants connected with at least one host in an online interaction, according to one or more embodiments of the invention.

While the method and apparatus is described herein by way of example for several embodiments and illustrative drawings, those skilled in the art will recognize that the method and apparatus for presenting a participant engagement level in an online interaction are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for presenting a participant engagement level in an online interaction as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. Additionally, as used herein, the word "video" refers generally to any multi-media object or data, and although in various embodiments of the invention may refer to only a video object (still, animated or moving), in other embodiments, may refer to a combination of both video and audio objects or an audio object alone.

DETAILED DESCRIPTION OF EMBODIMENTS

Embodiments of the present invention comprise a method and apparatus for presenting a participant engagement level in an online interaction. Online meetings are interactive, allowing for substantial participation via a web browser. During online interactions, a host may post questions, take polls, share notes and documents, and the like. Online meetings also allow participants to chat online with one another and partake in other interactive activities. Embodiments of the invention compute attentiveness for at least one participant of an online meeting and calculate an overall meeting engagement level based on the combination of all participants' computed attentiveness levels. Attentiveness is measured in activity points and is calculated on a scale of 0 to 100, wherein the higher the score, the more attentive the participant is in the online meeting. When a participant enters a meeting, the participant's engagement level is set to 70. At that moment, the meeting window is active and has focus, meaning it is the active window in the participant's browser. Activity points are defined for participation in various online meeting activities. For example, when the participant's meeting window loses focus, meaning it is hidden or minimized by the participant, the participant's total activity point value is set to, for example, 20. When the participant's meeting window has focus, but the participant does not respond to a poll, the participant's total activity point value is reduced by, for example, 20 points. Each activity is associated with an activity point value or a gain or loss of activity points. The activities and their associated activity points are stored in an activity point table in memory. When a participant responds to a poll, asks or answers questions, adds notes, and the like, the participant's total activity point value is set to 100 points because the participant is explicitly participating in the online meeting. However, a moment of explicit participation may be followed by prolonged passive participation, wherein the participant maintains a view of the online meeting in the participant's browser, but does not interact with the online meeting. As such, points given for explicit participation are subject to decay. For each sub-period of time, up to a maximum period, wherein the participant does not interact with the online meeting, the activity points are subject to decay. For example, each minute, up to five minutes wherein the participant does not interact with the online meeting in any way, the total points awarded for explicit participation is multiplied by 1.0 after the first minute, 0.8 after the second minute, 0.6 after the third minute, 0.4 after the fourth minute, and 0.2 after the fifth minute. During these five minutes when the participant's activity points are subject to decay, the participant may engage in some other explicit activity, which can add or subtract from the current calculated activity points and stop the decay. These activity points are calculated continuously during the online meeting.

Periodically, attentiveness data is sent from each participant computer to the host computer. Attentiveness data comprises information gathered in the previous one minute cycle on the participant's computer such as the maximum activity points computed for the participant during the previous one minute cycle, a current total activity point value, a number of polls to which the participant responded, a number of questions answered, status updates, notes added, and the like. The participant data received from the participant computers, which is based on the previous one minute cycle, is combined with participant data received on the host computer from other participants and further combined with participant data received during the meeting up until this time. This information is used to calculate a meeting engagement level, which refers to the overall engagement of one or all participants over the course of the entire meeting. An engagement level for the entire meeting session is displayed to the host. In one embodiment, the engagement level is the average meeting engagement across all participants in the meeting. In addition, an average engagement level for each participant may be calculated and displayed. Each participant's attentiveness score for the previous minute may be displayed to the host. In some embodiments, other metrics are displayed, such as a number of participants who participated in a question and answer (Q&A) session, a number of participants who responded to each question during a Q&A session, and the like. Any combination of metrics describing participant attentiveness or overall meeting engagement factors that can be calculated from the attentiveness data received on the host computer may be displayed to the host on a meeting dashboard, thereby providing a complete picture of the participant attentiveness, and therefore engagement levels of all of the participants to a host.

Various embodiments of an apparatus and method for calculating meeting engagement level of an online meeting are described. In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a block diagram showing one or more participants connected with at least one host in an online interaction, according to one or more embodiments of the invention. The system 100 comprises a host computer 102, and at least one participant computer 106. The host computer 102 and participant computer(s) 106 are connected via a network 104.

In some embodiments, the network 104 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface may support communication via wired or wireless general data networks, such as any suitable type of Ethernet network, for example; via telecommunications/telephony networks such as analog voice networks or digital fiber communications networks; via storage area networks, such as Fibre Channel SANs, or via any other suitable type of network and/or protocol.

The host computer 102 is a type of computing device (e.g., a laptop, a desktop, a Personal Digital Assistant (PDA) and/or the like). The host computer 102 comprises a CPU 108, support circuits 110, a display 112, and a memory 118. The CPU 108 may comprise one or more commercially available microprocessors or microcontrollers that facilitate data processing and storage. The various support circuits 110 facilitate the operation of the CPU 108 and include one or more clock circuits, for example a meeting timer, power supplies, cache, input/output circuits, displays, and the like. The display 112 comprises a meeting window 114 and a meeting dashboard 116. The memory 118 comprises at least one of Read Only Memory (ROM), Random Access Memory (RAM), disk drive storage, optical storage, removable storage and/or the like. The memory 118 comprises an operating system 120, online meeting software 122, an engagement calculator 124, and participant data 126.

According to some embodiments, the operating system 120 generally manages various computer resources (e.g., network resources, file processors, and/or the like). The operating system 120 is configured to execute operations on one or more hardware and/or software modules, such as Network Interface Cards (NICs), hard disks, virtualization layers, firewalls and/or the like. Examples of the operating system 120 may include, but are not limited to, Linux, Mac OSX, BSD, UNIX, Microsoft Windows, and the like. The online meeting software 122 may be any online meeting software such as ADOBE® CONNECT™ available from ADOBE Systems Incorporated, San Jose, Calif., capable of connecting participants over network.

The participant computer 106 is a type of computing device (e.g., a laptop, a desktop, a Personal Digital Assistant (PDA) and/or the like). The participant computer 106 comprises a CPU 128, support circuits 130, and a memory 132. The CPU 128 may comprise one or more commercially available microprocessors or microcontrollers that facilitate data processing and storage. The various support circuits 130 facilitate the operation of the CPU 128 and include one or more clock circuits, for example a meeting timer, power supplies, cache, input/output circuits, displays, and the like. The memory 132 comprises at least one of Read Only Memory (ROM), Random Access Memory (RAM), disk drive storage, optical storage, removable storage and/or the like. The memory 132 comprises an operating system 134, a browser 136, an attentiveness calculator 138, attentiveness data 140, an activity points table 142, a delay calculator 144, and an activity monitor 146. The activity points table 142 is a text file comprising entries mapping different participant meeting activities to activity points, and an indicator regarding whether the activity points are subject to decay.

According to some embodiments, the operating system 134 generally manages various computer resources (e.g., network resources, file processors, and/or the like). The operating system 134 is configured to execute operations on one or more hardware and/or software modules, such as Network Interface Cards (NICs), hard disks, virtualization layers, firewalls and/or the like. Examples of the operating system 134 may include, but are not limited to, Linux, Mac OSX, BSD, UNIX, Microsoft Windows, and the like. According to one or more embodiments, the browser 136 includes a software application for accessing Internet resources (e.g., domain names, Uniform Resource Locators (URLs), and/or the like) and displays contents associated with the Internet resources. The resources may further be identified through Uniform Resource Identifier (URI) and/or may be a web page, image, video, or other piece of content. The browser 136 may include, but are not limited to, Windows Internet Explorer (IE), Mozilla Firefox, Apple Safari, Google Chrome, Opera, Internet Explorer Mobile (IE), jB5, WebOS, Opera Mobile, and/or the like. The browser 136 further includes a browser component (not shown) configured to provide additional functionalities for the browser (e.g., an add-on, plug-in or extension that facilitates web browsing in accordance with one or more embodiments of the invention).

The online meeting software 114, for example, ADOBE® CONNECT™, runs inside the browser 136 and also runs within an add-in (not shown) based on ADOBE® Flash Player. Via the browser 136 using JavaScript, the add-in, and Flash Player, the activity monitor 146 is able to determine a participant's attentiveness (i.e., the participant's interaction with the online interaction). For example, the activity monitor 146 is able to identify a state of a window, such as in focus, minimized, maximized, or full-screen. The online meeting software 114 knows when a poll is active and open for polling. The online meeting software 114 also knows if a participant has voted in the poll or not. Using this information in combination, the activity monitor 146 can determine when a poll is currently open but the participant has not voted.

The host computer 102 initiates an online meeting using the online meeting software 122 in the meeting window 114 of the display 112. Participants, who may be presenters in the meeting, access the online meeting using the browser 136 on the participant computer 106. While the online meeting is in progress, the activity monitor 146 continually monitors the participant's interactions with the online meeting. The attentiveness calculator 138 calculates activity points based on the participant's interactions detected by the activity monitor 146. The participant may earn 0 to 100 activity points. For example, when a participant joins an online meeting, the activity monitor 146 detects the meeting window of the browser 136 has focus, meaning the meeting window is active. The attentiveness calculator 138 accesses the activity points table 142. The activity points table 142 contains an entry associated with "browser in focus" and an associated activity point value of "70". The attentiveness calculator 138 stores the current activity point value of 70 in the attentiveness data 140. If during the online meeting, the activity monitor 146 detects a polling session that is opened that requires a response and the participant does not provide a response, the attentiveness calculator 138 accesses the activity points table 142 that may contain the entry associated with "window has focus, but no poll response" that has an associated points value of "minus 20". The attentiveness calculator 138 subtracts the 20 points from the total activity point value, giving the participant a score of 50 activity points. This total activity point value is stored in attentiveness data 140. The attentiveness calculator 138 also stores the highest earned activity points for the current period, for example, the current one-minute cycle, in attentiveness data 140. If the activity monitor 146 determines the online meeting window in the browser 136 has been minimized, the attentiveness calculator 138 accesses the activity points table 142 to find that this gives the participant a score of, for example, 20 activity points. When the total activity point value is stored, the highest earned activity points for the current one-minute cycle is updated if the activity point value is higher than the highest earned activity points.

When the activity monitor 146 detects the participant has explicitly participated in the online meeting by, for example, answering a poll, sending a chat, scrolling through notes, setting a status, or the like, the attentiveness calculator 138 accesses the activity points table 142 to determine how many points the participant earns for that activity, for example, a score of 100. In addition to providing the activity points for an activity, the activity points table 142 provides information regarding whether the points are subject to decay. Decay addresses the participant who may explicitly participate in the online meeting for a moment of attentiveness, but then takes no explicit action thereafter; in other words, passively participates in the online meeting. In response to this passive participation, the decay calculator 144 decreases the total activity points earned for the explicit participation. Although, explicit participation has occurred, for each sub-period of time, up to a maximum period, wherein the participant does not interact with the online meeting, the decay calculator 144 decreased the total acidity points earned. For example, every minute, for up to five minutes of passive participation, the decay calculator 144 recalculates the total activity point value. The decay calculator 144 multiplies the activity points earned for the explicit participation by 1.0 after the first minute. After another minute of passive participation, the decay calculator 144 multiplies the activity points earned for the explicit participation by 0.8 for the second minute. The decay calculator 144 continues this process by multiplying the activity points earned for the explicit participation by 0.6 after the third minute, 0.4 after the fourth minute, and 0.2 after the fifth minute. Hence, if an activity is worth 100 activity points, its decay values calculated for the next five cycles are 100, 80, 60, 40, and then 20. If an activity is worth 80 activity points, its decay values calculated for the next five cycles are 80, 64, 48, 32, and then 16. However, during the five minutes in which the participant's activity points decay, the participant may engage in some other meeting activity, which can add to, subtract from, or automatically change the current calculated activity points and stop the decaying of activity points.

According to some embodiments, at one minute intervals, the maximum activity point value calculated by the attentiveness calculator 136 during the previous one minute interval on the participant computer 106 is sent to the host computer 102. In some embodiments, all attentiveness data 140 is sent to the host computer 102. The engagement calculator 124 on the host computer 124 collates the data of each participant and averages the participant attentiveness scores to determine a meeting engagement index for the whole meeting. The attentiveness data 140, collated data, and calculated results are stored as participant data 126 on the host computer 124. The participant data 126 may include participant attentiveness scores, individual participant polling results, question and answer result summaries. Various metrics derived from the participant data 126 along with the meeting engagement index are displayed on the meeting dashboard 116 on the display 112 of the host computer 102. The meeting engagement index is recalculated by the engagement calculator 124 every minute when the attentiveness data 140 calculated by the attentiveness calculator 138 is sent to the host computer 102 from each of the one or more participants.

According to some embodiments, a participant's activity points are sent to the host computer 102 each time the participant's activity point total changes. When participant data arrives on the host computer 102, the engagement index is recalculated by the engagement calculator 124. This provides the host with a live attentiveness reading.

According to some embodiments, each participant's activity points are displayed on the display 112 of the host computer 102 on individual participant dashboards (not shown). This provides the host with information regarding which participants are not paying attention to, for example, an online training session.

Figure 2:
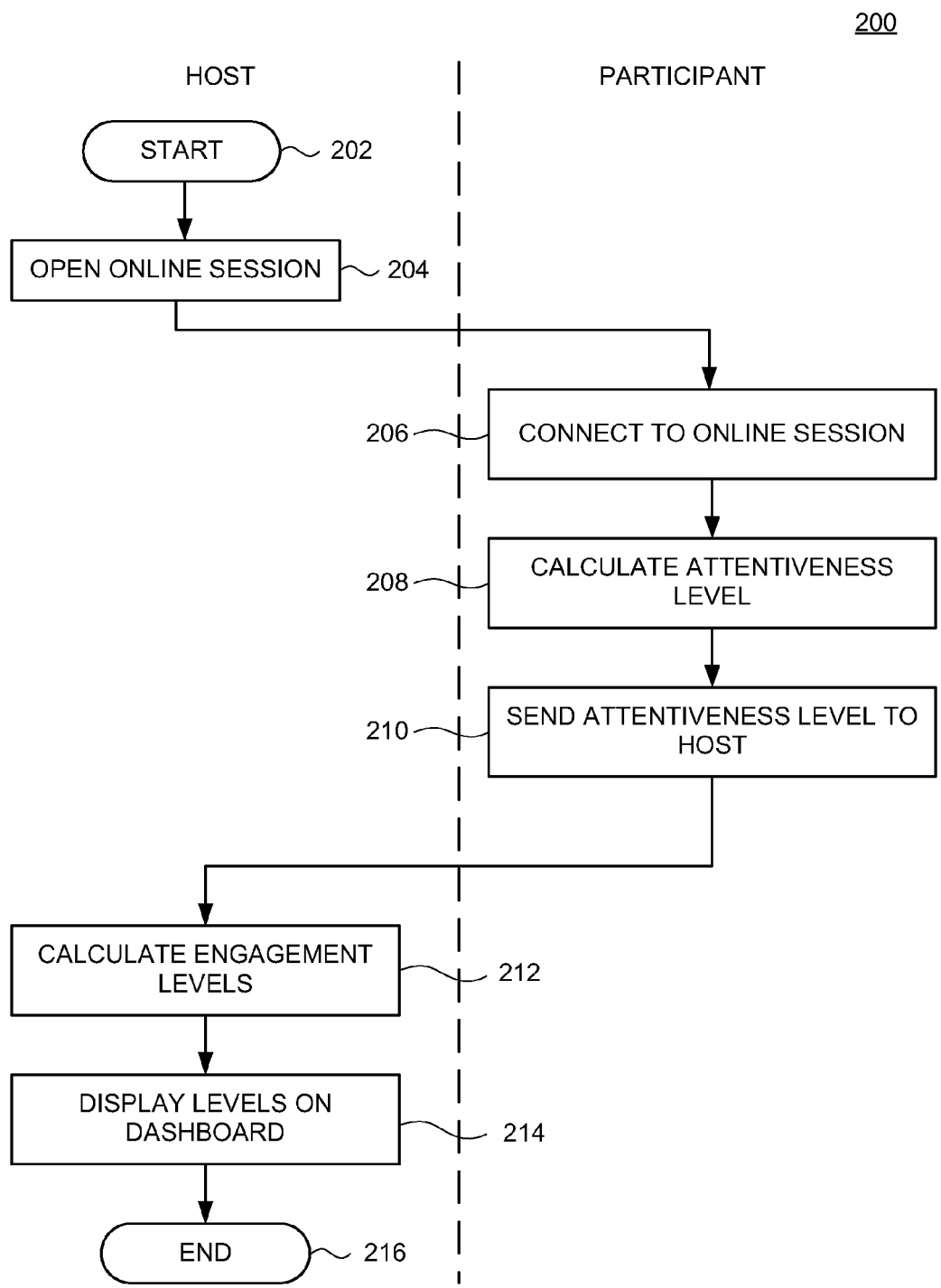
FIG. 2 depicts a flow diagram of a method for presenting a participant engagement level in an online interaction as performed by the system of FIG. 1, according to one or more embodiments of the invention.

FIG. 2 depicts a flow diagram of a method for presenting a participant engagement level in an online interaction as performed by the system 100 of FIG. 1, according to one or more embodiments of the invention.

The method 200 starts at step 202 and proceeds to step 204. The method 200 opens an online session on the host computer. The online session may be a meeting, collaboration, webinar, or any form of multiparty interaction on the web. The online session may be opened using an application such as ADOBE® Connect. The method 200 proceeds to step 204. At step 206, the method 200 connects at least one participant to the online session via a web browser on the participant's computer. The method 200 proceeds to step 208. At step 208, an attentiveness level is calculated on the participant's computer based on the level of interaction with the online session, as described in detail with respect to FIG. 3 below. The method 200 proceeds to step 210. At step 210, the method 200 sends the calculated attentiveness level to the host computer. The method 200 proceeds to step 212. At step 212, the method 200 calculates engagement levels for the session as described in detail with respect to FIG. 6 below. The method 200 proceeds to step 214. At step 214, the engagement levels for the session are display on a meeting dashboard, as described in detail with respect to FIG. 7 below. The method 200 proceeds to step 216 and ends.

Figure 3:
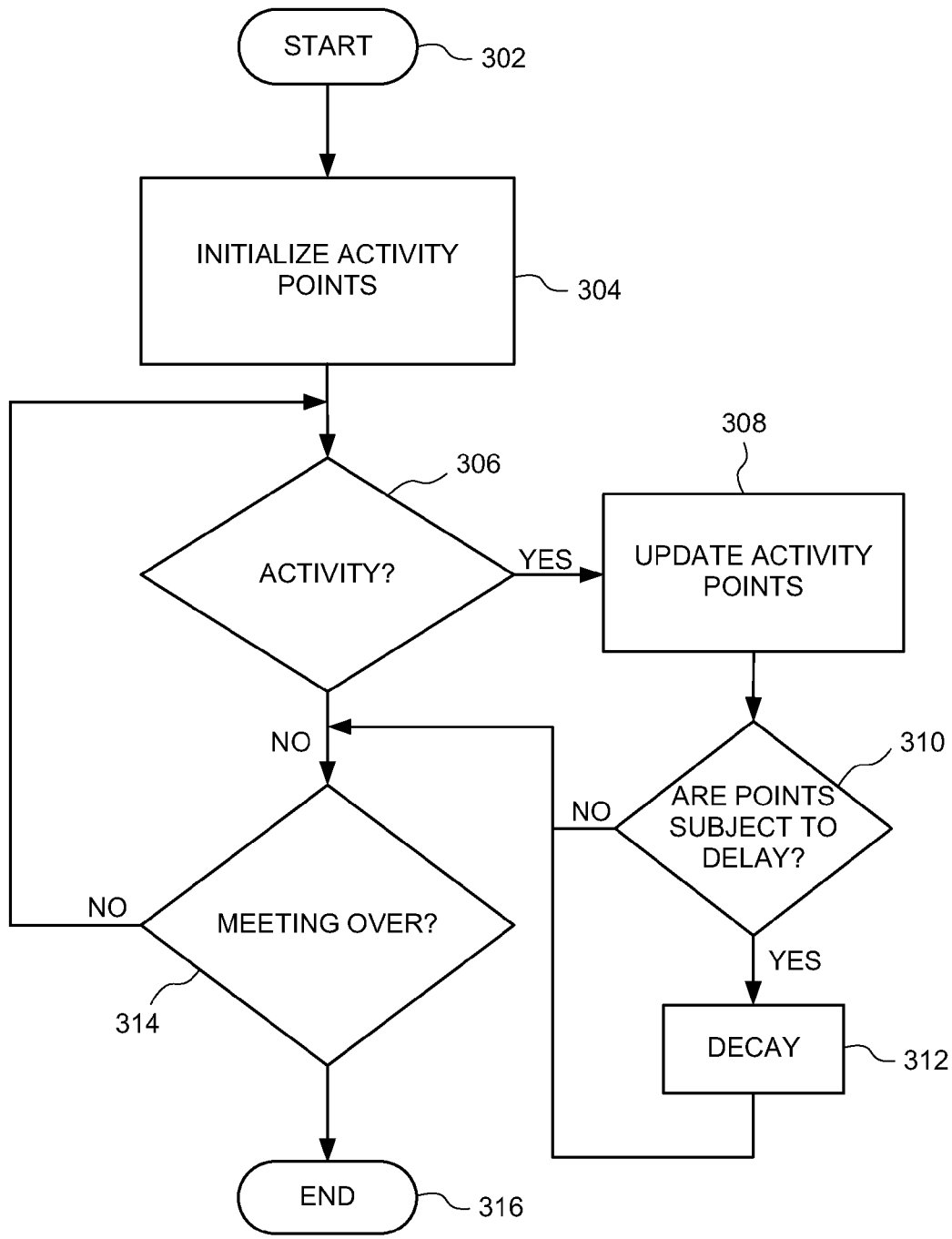
FIG. 3 depicts a flow diagram of a method for calculating a participant's attentiveness level in an online interaction as performed by the attentiveness calculator of FIG. 1, according to one or more embodiments of the invention.

FIG. 3 depicts a flow diagram of a method 300 for calculating a participant's attentiveness level in an online interaction as performed by the attentiveness calculator 138 of FIG. 1, according to one or more embodiments of the invention.

The method 300 starts at step 302 and proceeds to step 304. At step 304, the method 300 initializes the current total activity point value and the highest activity point value. When a participant enters a meeting, the meeting window on the participant's browser has focus, meaning it is the active window. When the meeting window is activated, the method 300 accesses the activity points table to determine the activity points associated with that activity. The points associated with activating the meeting window is, for example, 70 activity points. Therefore the current total activity point value is 70. Since the participant has just joined the online meeting, this point value is the highest point value earned during the current one-minute cycle. As such, the highest activity point value is also set to 70. The method 300 proceeds to step 306.

At step 306, the method 300 determines whether there has been any meeting or participant activity. A meeting activity may be a poll presented by a meeting host, a question posed, and the like. Participant activity may be responding to a poll, answering a question, chatting with other participants or the host, downloading notes from the online meeting and the like. If there is meeting or participant activity, the method 300 proceeds to step 308. If there is no activity, the method 300 proceeds to step 314.

At step 308, the method 300 updates the activity point values based on the activity. Each activity is associated with an activity point value. These values are stored in an activity point table in the memory of the participant computer. The method 300 accesses the activity point table to determine the activity points associated with the activity. For example, if a poll is presented by the meeting host and the participant does not participate in the poll, the method 300 finds that this lack of participation in a poll is associated with an activity point value of, for example, "minus 20". As such, the method 300 subtracts 20 from the current total point value, leaving the participant with a current total point value of 50. If, however, the participant responds to a poll, the method 300 finds that this activity associated with an activity point value of, for example, 100 activity points. Hence, the total activity point value is set to 100. After the total activity point value is determined, it is compared to the highest point value earned during the current one-minute cycle. The total activity point value of 100 is higher than the stored highest point value of 70. Thus, the method 300 updates the highest point value to 100. The method 300 proceeds to step 310.

At step 310, the method 300 determines if the current activity point value is subject to decay. The decay calculation is described in detail with respect to FIG. 3. The activity point table contains an indicator for each activity indicating whether the activity point value is subject to decay. Activities typically subject to decay are explicit participation activities, such as participating in a poll, answering a question, downloading documents or notes, and the like, where the participant is actively interacting with the online meeting. Although a participant is given points for explicit participation, this activity may be followed by a period of passive participation on the part of the participant. This passive participation is reflected in the participant's total activity point value using decay. If the activity is not subject to decay, the method 300 proceeds to step 314. However, if the activity is subject to decay, the method 300 proceeds to step 312.

At step 312, the method 300 activates the activity point decay as described further in FIG. 3 below. The method 300 proceeds to step 314.

At step 314, the method 300 determines whether the online meeting has ended. If the online meeting has not ended, the method 300 proceeds to step 306 and continues to monitor the participant attentiveness. If at step 314, the method 300 determines that the online meeting has ended, the method 300 proceeds to step 316 and ends.

Figure 4:
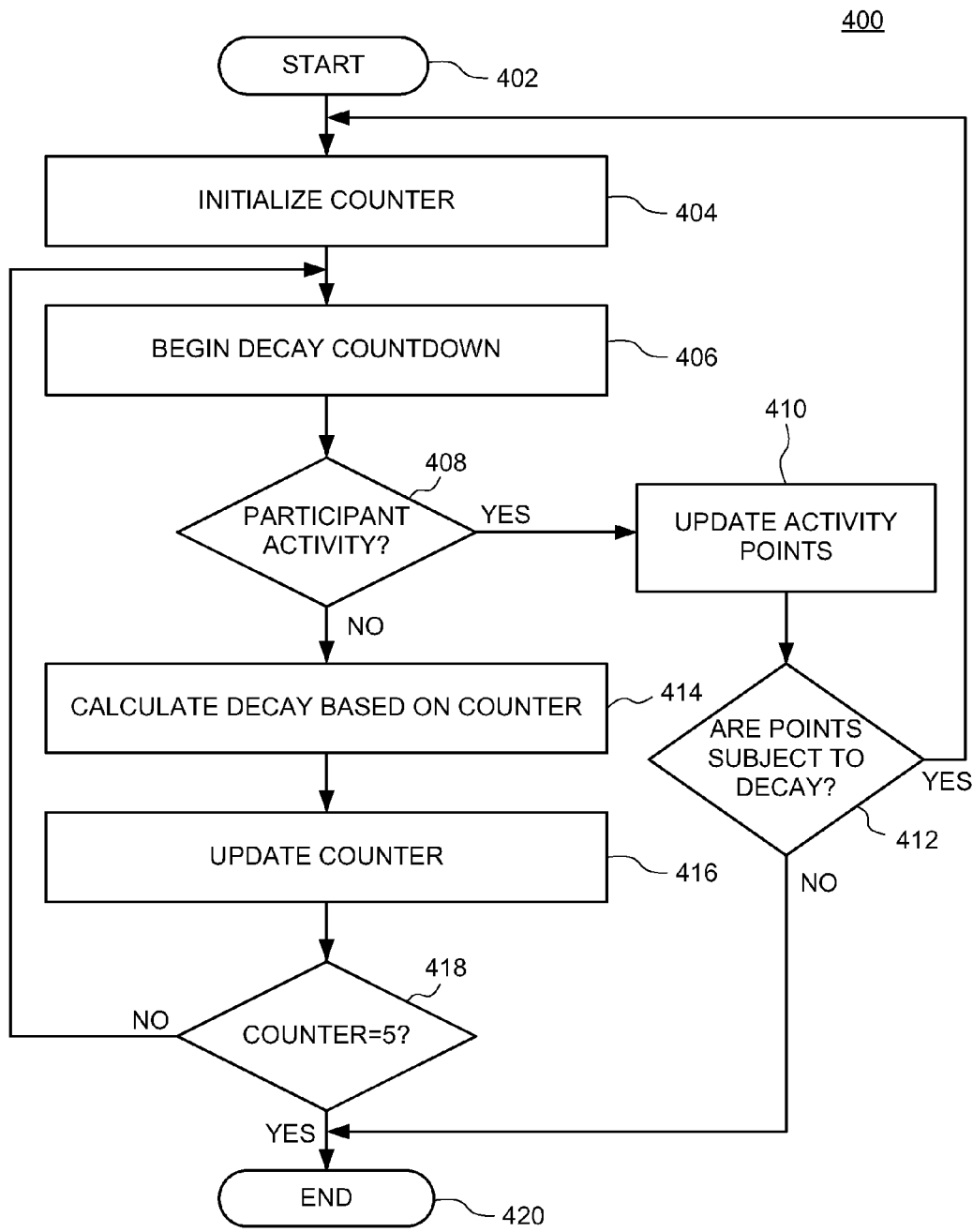
FIG. 4 depicts a flow diagram of a method for computing decay of activity points as performed by the decay calculator of FIG. 1, according to one or more embodiments of the invention.

FIG. 4 depicts a flow diagram of a method 400 for computing decay of activity points as performed by the decay calculator 144 of FIG. 1, according to one or more embodiments of the invention. Decay is performed on activity points marked for decay in the activity point table.

The method 400 starts at step 402 and proceeds to step 404. At step 404, the method 400 initializes a decay counter. Decay is calculated every minute for five minutes unless the participant performs some other activity in the online meeting. For example, the decay counter is initially set to a value of zero. The method 400 proceeds to step 406. At 406, the method 400 begins a countdown for a periodic time period, for example, a one-minute countdown for decay. The method 400 proceeds to step 408.

At step 408, the method 400 determines whether the participant is partaking in any online meeting activity during the one-minute countdown. If during the one-minute decay countdown, the method 400 determines there is participant activity in the online meeting, the method 400 proceeds to step 410. At step 410, the method 400 updates the participant's activity points as described above in step 308 of FIG. 3. The method 400 proceeds to step 412. At step 412, the method 400 determines whether the participant activity is subject to decay. If the participant activity is subject to decay, the method 400 proceeds to step 404. If the participant activity is not subject to decay, the method 400 proceeds to step 420.

If at step 408, the method 400 determines no participant activity has occurred and the one-minute decay countdown has reached zero, the method 400 proceeds to step 414. At step 414, the method 400 calculates the decay on the activity points. The following is an exemplary embodiment of the decay calculation. Decay may occur for any sub-period over any time period and decay at any predefined rate. In the present example, the method 400 reads the decay counter. If the decay counter has a value of 0, the method 400 calculates the activity points by multiplying the activity points earned for the explicit participation by 1.0. If the decay counter has a value of 1, the method 400 multiplies the activity points earned for the explicit participation by 0.8. If the decay counter has a value of 2, the method 400 multiplies the activity points earned for the explicit participation by 0.6. If the decay counter has a value of 3, the method 400 multiplies the activity points earned for the explicit participation by 0.4. If the decay counter has a value of 4, the method 400 multiplies the activity points earned for the active participation by 0.2. The calculated value is saved as the current total activity point value. After the current total activity point value is determined, it is compared to the highest point value earned during the current one-minute cycle. If the current total activity point value is higher than the stored highest point value the method 400 updates the highest point value to equal the current total activity point value. The method 400 proceeds to step 416.

At step 416, the method 400 increments the decay counter by 1. The method 400 proceeds to step 418. At step 418, the method 400 determines whether the decay counter is equal to 5. If the decay counter is not equal to 5, the method 400 proceeds to step 406, where the method 400 iterates until the participant activity points have decay five times over a period of five minutes or until the participant interacts with the online meeting. If at step 418, the method 400 determines the decay counter is equal to 5, the decaying of activity points ceases. The method 400 proceeds to step 420 and ends.

Figure 5:
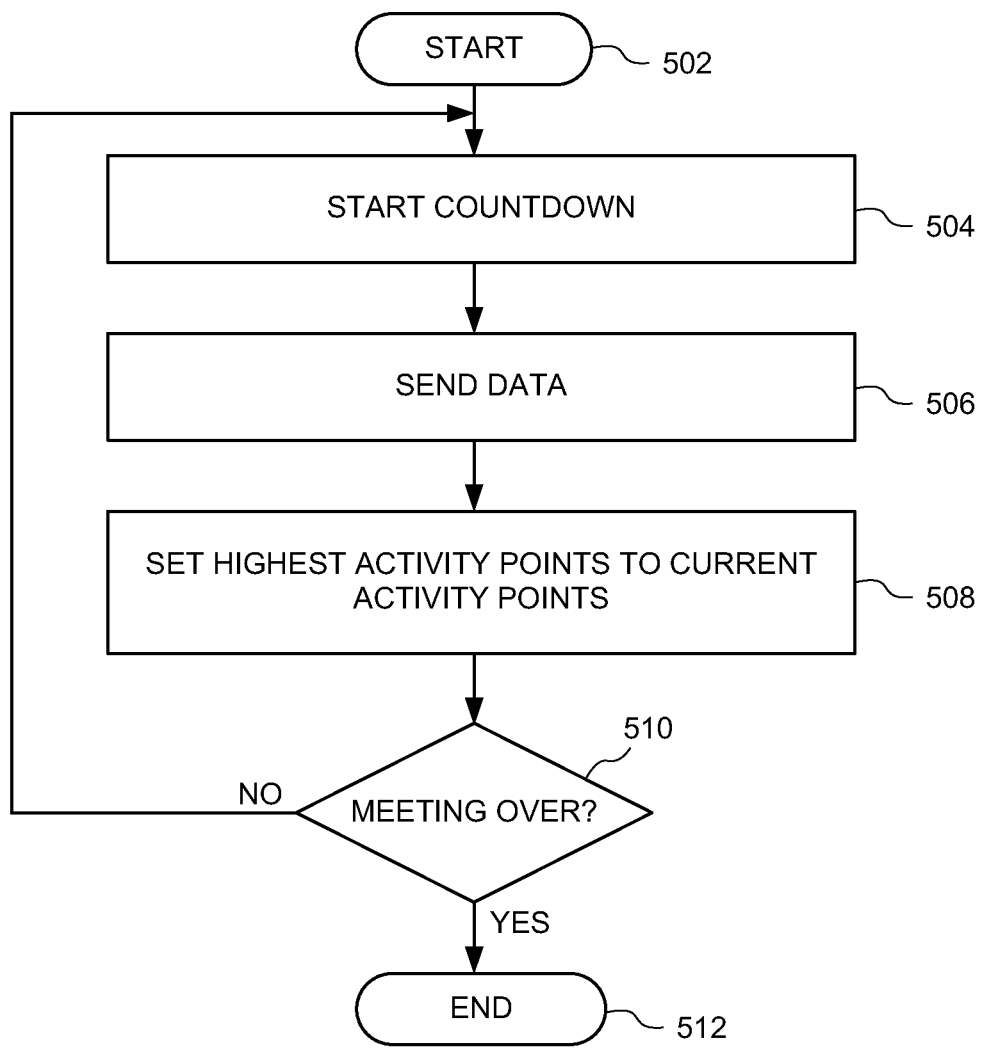
FIG. 5 depicts a flow diagram of a method for sending participant attentiveness data to the host computer as performed by the system of FIG. 1, according to one or more embodiments of the invention.

FIG. 5 depicts a flow diagram of a method 500 for sending participant attentiveness data to the host computer as performed by the system 100 of FIG. 1, according to one or more embodiments of the invention. The method 500 runs in parallel to method 200 above. Method 500 is initiated at the start of the online meeting and runs continuously until the online meeting ends.

The method 500 starts at step 502 and proceeds to step 504. At step 504, the method 500 performs a countdown for a predefined period of time, for example, one minute. At the end of the countdown, the method 500 proceeds to step 506. At step 506, the method 500 sends the participant attentiveness data calculated during the previous one minute cycle, from the participant computer to the host computer. The method 500 proceeds to step 508. At step 508, the method 500 sets the highest activity score to be equal to the current total activity point value. The method 500 proceeds to step 510. At step 510, the method 500 determines whether the online meeting has ended. If the online meeting has not ended, the method 500 proceeds to step 504. However, if at step 510, the method 500 determines the online meeting has ended, the method 500 proceeds to step 512 and ends.

Figure 6:
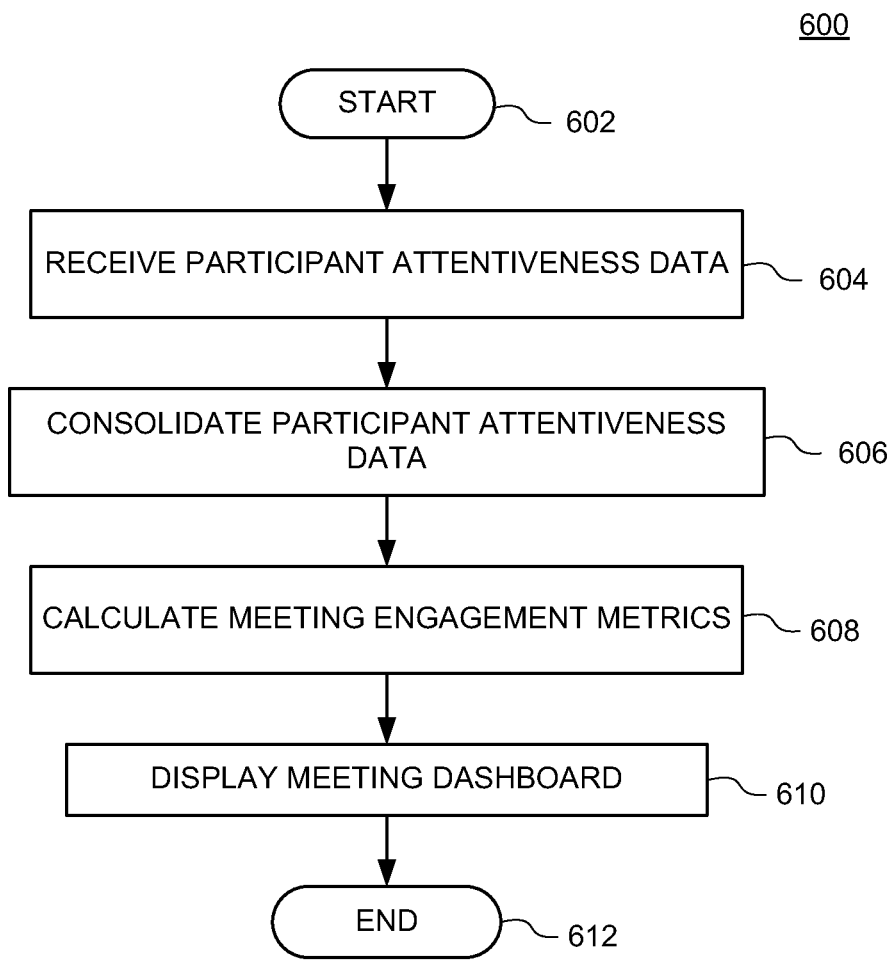
FIG. 6 depicts a flow diagram of a method for processing participant data as performed by the engagement calculator of FIG. 1, according to one or more embodiments of the invention.

FIG. 6 depicts a flow diagram of a method 600 for processing participant data as performed by the engagement calculator 124 of FIG. 1, according to one or more embodiments of the invention. The method 600 calculates metrics on the participant data and displays the metrics on a meeting dashboard illustrated in FIG. 6 below.

The method 600 starts at step 602 and proceeds to step 604. The method 600 receives attentiveness data from each participant computer of an online meeting. Attentiveness data includes a highest activity score for each participant for the previous one-minute cycle. Attentiveness data may also include a number of polls in which the participant took part, a number of questions answered, and the like. The method 600 proceeds to step 606.

At step 606, the method 600 consolidates the data received from each participant computer into a single file containing all participant data. Participant data may include a total number of questions asked by a meeting host and a total number of questions answered, a total number of participants accessing the online meeting, individual attentiveness for each participant, and the like. The method 600 proceeds to step 608.

At step 608, the method 600 calculates a meeting engagement level. The meeting engagement level is the average of all participant attentiveness scores combined that were received since the start of the online meeting. In addition, the average engagement level over the previous minute is calculated. The method 600 proceeds to step 610.

At step 610, the method 600 displays the meeting engagement level in addition to other relevant metrics on a meeting dashboard as illustrated further in FIG. 7 below. The method 600 proceeds to step 612 and ends.

Figure 7:
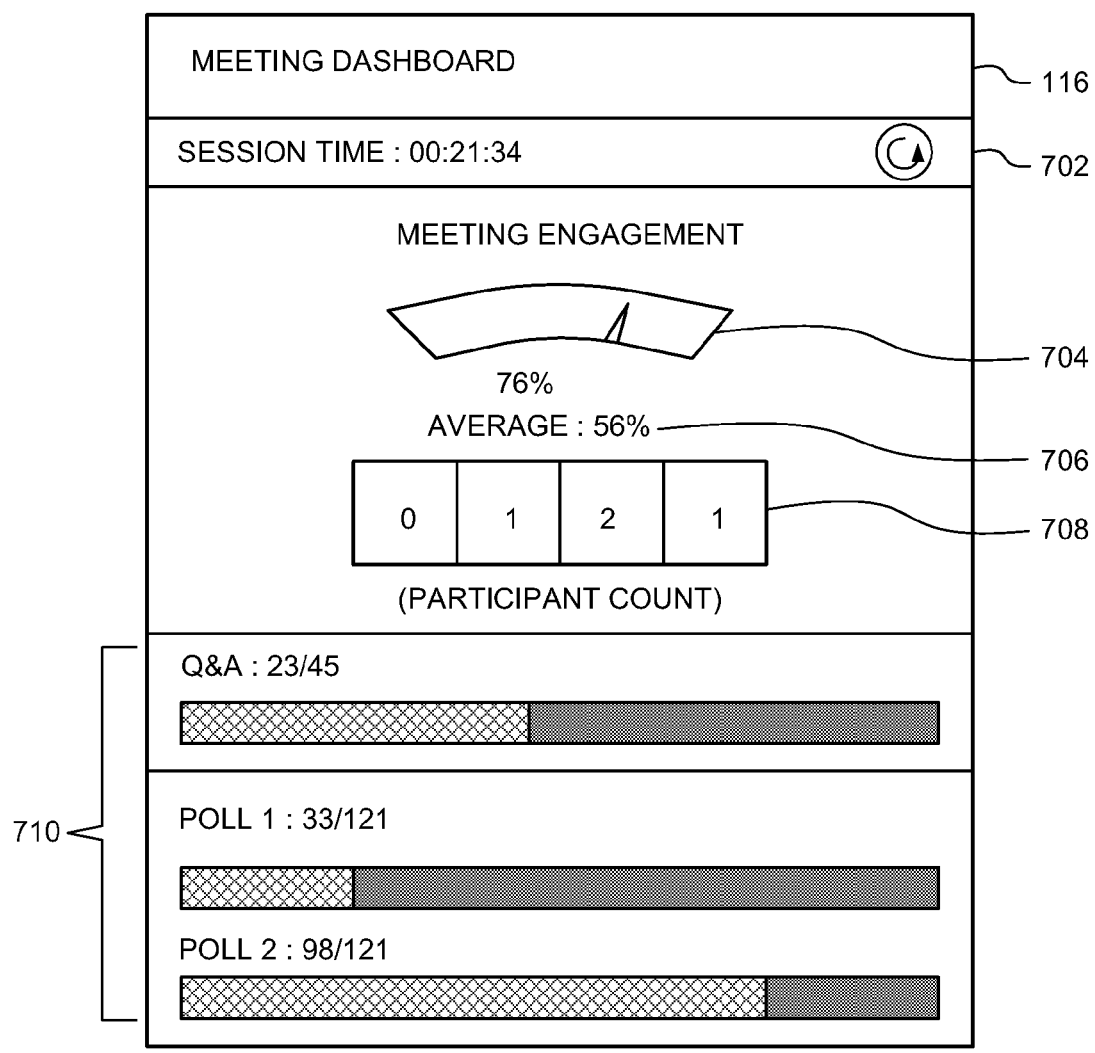
FIG. 7 depicts a schematic illustrating the use of the meeting dashboard of FIG. 1, according to one or more embodiments of the invention.

FIG. 7 depicts a schematic illustrating the use of a meeting dashboard 116 of FIG. 1 according to one or more embodiments of the invention. Various meeting metrics are displayed on the meeting dashboard. In one embodiment, the meeting dashboard 116 depicts a meeting duration 702, a meeting engagement level 704, an average meeting engagement level 706, a participant count 708, and various other activity metrics 710, which are relevant to the online meeting. In other embodiments, other combination and/or different metrics may be utilized.

The meeting engagement 704 indicates the average engagement of all participants over the previous one-minute cycle of the online meeting. The averaging meeting engagement 706 is an average of all participant engagement over the course of the entire meeting. The participant count 708 indicates the total number of participants engaged in the online meeting. The activity metrics 710 may be a display of any activity desired by the host of the online meeting, in this example question and answer session participation and polling participation. The example of the meeting dashboard is meant to be purely illustrative. Any information or metrics relevant to the online meeting may be displayed on the meeting dashboard. In addition, any number of meeting dashboards may be displayed, for example, one for each participant of the online meeting to provide individualized information to the meeting host regarding each specific participant.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 8:
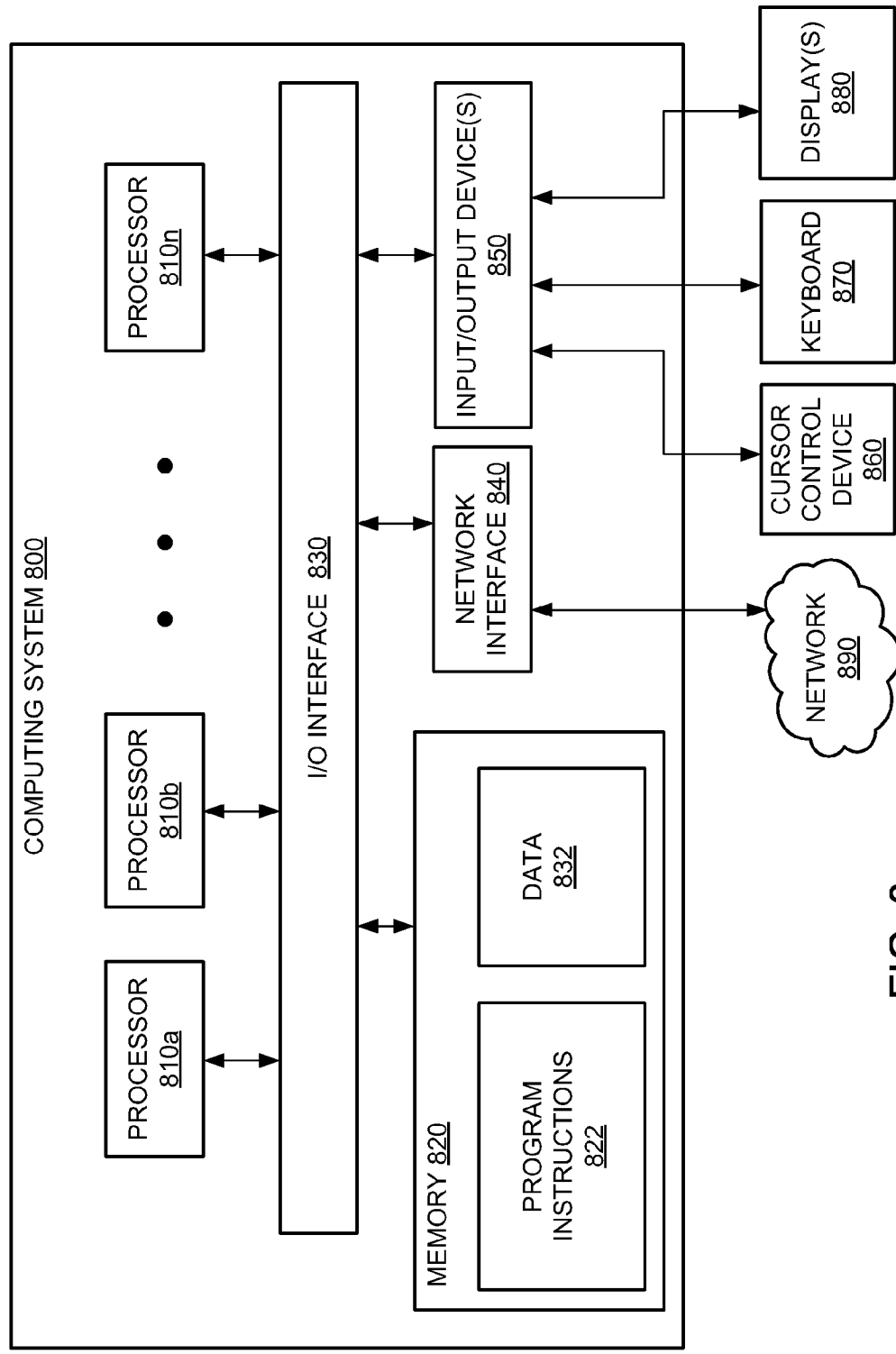
FIG. 8 depicts a computer system that can be utilized in various embodiments of the present invention, according to one or more embodiments of the invention.

FIG. 8 depicts a computer system that can be used to implement the methods of FIGS. 2-7 in various embodiments of the present invention, according to one or more embodiments of the invention. FIG. 8 depicts a computer system that can be utilized in various embodiments of the present invention to implement the computer 102, according to one or more embodiments.

Various embodiments of method and apparatus for presenting a participant engagement index in an online interaction, as described herein, may be executed on one or more computer systems, which may interact with various other devices. One such computer system is computer system 800 illustrated by FIG. 8, which may in various embodiments implement any of the elements or functionality illustrated in FIGS. 1-7. In various embodiments, computer system 800 may be configured to implement methods described above. The computer system 800 may be used to implement any other system, device, element, functionality or method of the above-described embodiments. In the illustrated embodiments, computer system 800 may be configured to implement methods 200, 300, 400, 500, and 600 as processor-executable executable program instructions 822 (e.g., program instructions executable by processor(s) 810) in various embodiments.

In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. In various embodiments, any of components may be utilized by the system to receive user input described above. In various embodiments, a user interface (e.g., user interface) may be generated and displayed on display 880. In some cases, it is contemplated that embodiments may be implemented using a single instance of computer system 800, while in other embodiments multiple such systems, or multiple nodes making up computer system 800, may be configured to host different portions or instances of various embodiments. For example, in one embodiment some elements may be implemented via one or more nodes of computer system 800 that are distinct from those nodes implementing other elements. In another example, multiple nodes may implement computer system 800 in a distributed manner.

In different embodiments, computer system 800 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs), such as the x96, PowerPC, SPARC, or MIPS ISAs, or any other suitable ISA. In multiprocessor systems, each of processors 810 may commonly, but not necessarily, implement the same ISA.

System memory 820 may be configured to store program instructions 822 and/or data 832 accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 820. In other embodiments, program instructions and/or data may be received, sent or stored upon different types of computer-accessible media or on similar media separate from system memory 820 or computer system 800.

In one embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one components (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network (e.g., network 890), such as one or more external systems or between nodes of computer system 800. In various embodiments, network 890 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touch pads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

In some embodiments, the illustrated computer system may implement any of the methods described above, such as the methods illustrated by the flowchart of FIGS. 2-6. In other embodiments, different elements and data may be included.

Those skilled in the art will appreciate that computer system 800 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer-implemented method for presenting a participant engagement level of an online interaction comprising:
    monitoring a plurality of activities of at least one participant of an online interaction, wherein each activity of the plurality of activities comprises at least one of an explicit activity by a participant or a passive activity by a participant in the online meeting;
    computing an attentiveness level in response to each activity in the plurality of activities, wherein computing comprises:
        applying an activity point value that is defined for each activity in the plurality of activities, and
        applying a decay rate, at predefined intervals, to the activity point value applied for explicit activity during a period of passive participation and not applying a decay rate to the activity point value applied for passive activity during the period of passive participation; and
    displaying a meeting engagement level, wherein the meeting engagement level is an average of the computed attentiveness level for the at least one participant since a start of the online interaction.

2. The method of claim 1, wherein monitoring comprises tracking interactions within an online interaction window.

3. The method of claim 1, wherein monitoring occurs continuously during the online meeting.

4. The method of claim 1, wherein the explicit activity comprises at least one of responding to a poll, responding in a chat, responding to a question and answer activity or downloading meeting material.

5. The method of claim 1 further comprising providing the attentiveness level of the at least one participant to a host of the online meeting.

6. A non-transitory computer readable medium for storing computer instructions that, when executed by at least one processor cause the at least one processor to perform a method for presenting a participant engagement index of an online interaction comprising:
    monitoring a plurality of activities of at least one participant of an online interaction, wherein said monitoring identifies each activity as one of an explicit activity taken by a participant so as to indicate interactive engagement with the online meeting or a passive activity taken by a participant so as to indicate no interactive engagement with the online meeting;
    computing an attentiveness level in response to each activity in the plurality of activities, wherein computing comprises applying an activity point value that is defined for each activity in the plurality of activities, and applying a decay rate, at predefined intervals, to the activity point value applied for explicit activity during a period of passive participation, and not applying a decay rate to the activity point value applied for passive activity during the period of passive participation; and
    displaying a meeting engagement level, wherein the meeting engagement level is an average of the computed attentiveness level for the at least one participant since a start of the online interaction.

7. The computer readable medium of claim 6, wherein monitoring comprises tracking interactions within an online interaction window.

8. The computer readable medium of claim 6, wherein monitoring occurs continuously during the online meeting.

9. The computer readable medium of claim 6, wherein the explicit activity comprises at least one of responding to a poll, responding in a chat, responding to a question and answer activity or downloading meeting material.

10. The computer readable medium of claim 6, further comprising providing the attentiveness level of the at least one participant to a host of the online meeting.

11. An apparatus for presenting a participant engagement level in an online interaction comprising:
    a browser for participating in an online interaction;
    an activity monitor for detecting a plurality of activities by a participant of the online interaction, wherein each activity of the plurality of activities comprise at least one of an explicit activity taken by a participant so as to indicate interactive engagement with the online meeting or a passive activity taken by a participant so as to indicate no interactive engagement while interacting with the online interaction via the browser;
    an attentiveness calculator for computing an attentiveness level based on the plurality of activities, wherein computing comprises applying an activity point value that is defined for each activity in the plurality of activities; and
    a decay calculator for applying a decay rate, at predefined intervals, to the activity point value applied for explicit activity during a period of passive participation, and not applying a decay rate to the activity point value applied for passive activity during the period of passive participation,
    wherein the browser is configured to display the participant engagement level and the participant engagement level is an average of the computed attentiveness level for the participant since a start of the online interaction.

12. The apparatus of claim 11, wherein the wherein computing comprises applying the decay rate, at predefined intervals, to the activity point value applied for explicit activity during a period of passive participation.

13. The apparatus of claim 11, wherein the explicit activity comprises at least one of responding to a poll, responding in a chat, responding to a question and answer activity or downloading meeting material.

14. The apparatus of claim 11, wherein the browser displays a meeting engagement level, wherein the meeting engagement level is an average of the computed attentiveness level for the at least one participant since a start of the online interaction.

* * * * *